(12) United States Patent
Pan

(10) Patent No.: US 10,795,852 B2
(45) Date of Patent: Oct. 6, 2020

(54) DATA CENTER MANAGEMENT SYSTEM AND METHOD

(71) Applicant: HONGFUJIN PRECISION ELECTRONICS (TIANJIN) CO., LTD., Tianjin (CN)

(72) Inventor: Sheng-Chung Pan, New Taipei (TW)

(73) Assignee: HONGFUJIN PRECISION ELECTRONICS (TIANJIN) CO., LTD., Tianjin (CN)

( * ) Notice: Subject to any disclaimer, the term of this patent is extended or adjusted under 35 U.S.C. 154(b) by 54 days.

(21) Appl. No.: 16/172,878

(22) Filed: Oct. 29, 2018

(65) Prior Publication Data
US 2020/0004720 A1 Jan. 2, 2020

(30) Foreign Application Priority Data
Jun. 28, 2018 (CN) .......................... 2018 1 0691812

(51) Int. Cl.
*G06F 15/177* (2006.01)
*G06F 15/16* (2006.01)
*H04L 12/24* (2006.01)
*H04L 29/12* (2006.01)

(52) U.S. Cl.
CPC ........ *G06F 15/161* (2013.01); *H04L 41/0856* (2013.01); *H04L 41/12* (2013.01); *H04L 61/103* (2013.01); *H04L 61/2007* (2013.01); *H04L 61/609* (2013.01); *H04L 61/6022* (2013.01)

(58) Field of Classification Search
USPC ...................................................... 709/220
See application file for complete search history.

(56) References Cited

U.S. PATENT DOCUMENTS

| | | | | |
|---|---|---|---|---|
| 7,526,562 B1 * | 4/2009 | Samprathi | ......... | H04L 29/12066 370/466 |
| 7,684,406 B2 * | 3/2010 | Hahn | ................ | H04L 29/12283 370/395.2 |
| 8,306,935 B2 * | 11/2012 | Doorhy | ............... | H04L 41/0806 706/45 |
| 8,793,351 B2 * | 7/2014 | Renzin | .................... | H04L 41/08 709/220 |
| 9,009,084 B2 * | 4/2015 | Brandt | ................ | H04L 63/1408 706/12 |
| 9,083,587 B2 * | 7/2015 | Babu | ..................... | H04L 61/203 |
| 9,423,854 B2 * | 8/2016 | Palmer | ................... | G06F 1/189 |
| 9,430,010 B2 * | 8/2016 | Palmer | ................... | H05K 7/1498 |
| 9,507,566 B2 * | 11/2016 | Payne | ........................ | G06F 7/58 |
| 9,537,819 B2 * | 1/2017 | Gossain | .............. | H04N 21/439 |

(Continued)

*Primary Examiner* — Alicia Baturay
(74) *Attorney, Agent, or Firm* — ScienBiziP, P.C.

(57) ABSTRACT

A data management system deploys a number of server cabinets each deploying a number of servers. Each server is coupled to a data center network. The data management system includes a processor and a storage unit coupled to the processor. The processor is configured to pre-obtain a MAC address and location information pair of every server, save the information pair as a computer-readable document, obtain a MAC address of a server to be queried, and compare the MAC address of the server to be queried to the computer-readable document and obtain the physical address of the server to be queried. The information pair includes information of the MAC address and a corresponding physical location.

9 Claims, 3 Drawing Sheets

(56) References Cited

U.S. PATENT DOCUMENTS

| | | | | |
|---|---|---|---|---|
| 9,853,938 B2* | 12/2017 | Shih | .................... | H04L 61/2015 |
| 9,964,935 B2* | 5/2018 | Masuyama | ............ | G05B 15/02 |
| 10,075,332 B2* | 9/2018 | Palmer | .................... | H04L 67/10 |
| 10,122,585 B2* | 11/2018 | Masuyama | ............. | H04L 41/12 |
| 10,200,375 B2* | 2/2019 | Steele | .................. | H04L 63/101 |
| 10,250,447 B2* | 4/2019 | Palmer | .................... | H04L 41/12 |
| 2009/0024764 A1* | 1/2009 | Atherton | ........... | H04L 29/12254 |
| | | | | 709/250 |
| 2011/0069701 A1* | 3/2011 | Wu | ....................... | H04M 7/125 |
| | | | | 370/352 |
| 2012/0023572 A1* | 1/2012 | Williams, Jr. | ...... | H04L 63/1425 |
| | | | | 726/13 |
| 2015/0253794 A1* | 9/2015 | Palmer | ................. | H05K 7/1498 |
| | | | | 700/297 |
| 2015/0257311 A1* | 9/2015 | Palmer | ............... | G05D 23/1934 |
| | | | | 700/276 |
| 2019/0199675 A1* | 6/2019 | Ravishankar | ......... | H04L 45/021 |

* cited by examiner

DATA CENTER MANAGEMENT SYSTEM AND METHOD

FIELD

The subject matter herein generally relates to data center management, and more particularly to a data center management system and method of managing a data center.

BACKGROUND

Generally, data centers are composed of a plurality of server cabinets deploying a plurality of servers. The servers of the plurality of server cabinets are linked together in a network. If one of the servers needs to be queried to manage data of the server, the physical address of the server in the data center must be known.

BRIEF DESCRIPTION OF THE DRAWINGS

Implementations of the present disclosure will now be described, by way of example only, with reference to the attached figures.

DETAILED DESCRIPTION

Figure 1:
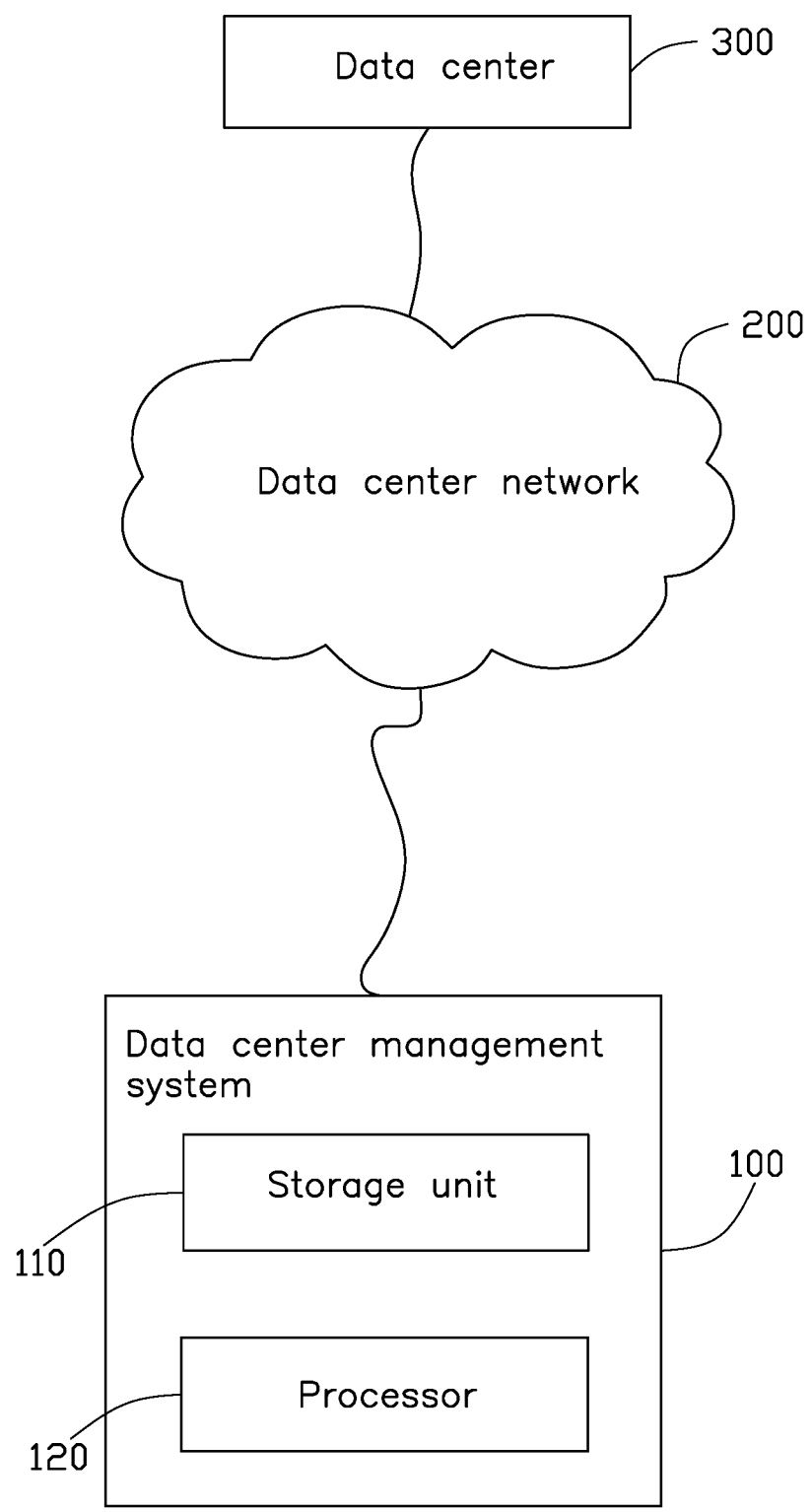
FIG. 1 is a diagram showing an embodiment of an environment of a data center management system in communication with a data center through a data center network in accordance with an embodiment of the present disclosure.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising" means "including, but not necessarily limited to"; it specifically indicates open-ended inclusion or membership in a so-described combination, group, series and the like.

Figure 2:
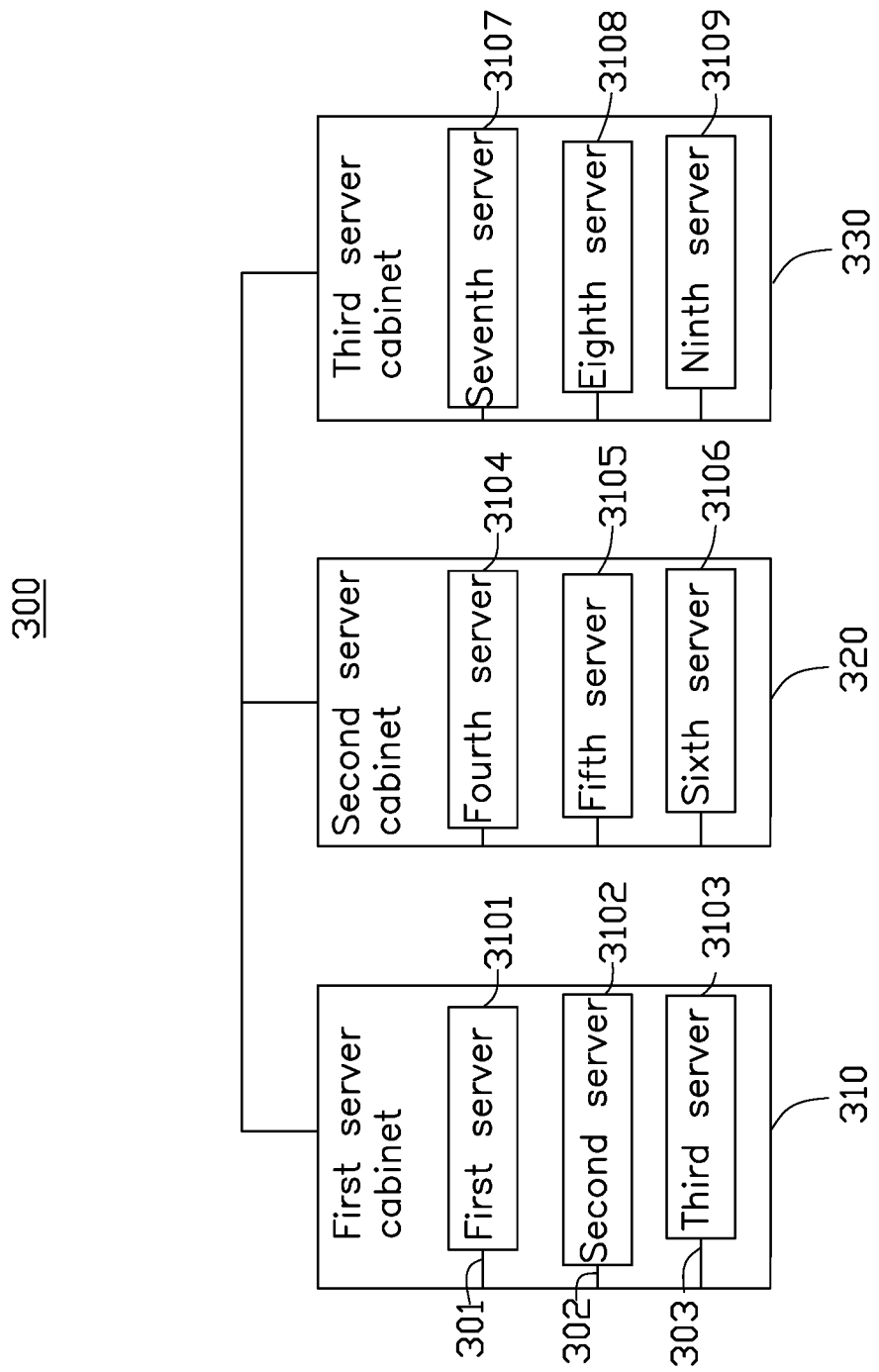
FIG. 2 is a block diagram of a plurality of server cabinets.

FIG. 1 and FIG. 2 illustrate an embodiment of a data center management system 100 for managing a data center 300. The data center 300 deploys a plurality of server cabinets. Each server cabinet deploys a plurality of servers. Each server is coupled to a data center network 200 and communicates with the data center management system 100 through the data center network 200.

The data center management system 100 includes a storage unit 110 and a processor 120 coupled to the storage unit 110.

The storage unit 110 stores a plurality of instructions executable by the processor 120 to implement a method of managing the data center 300.

Figure 3:
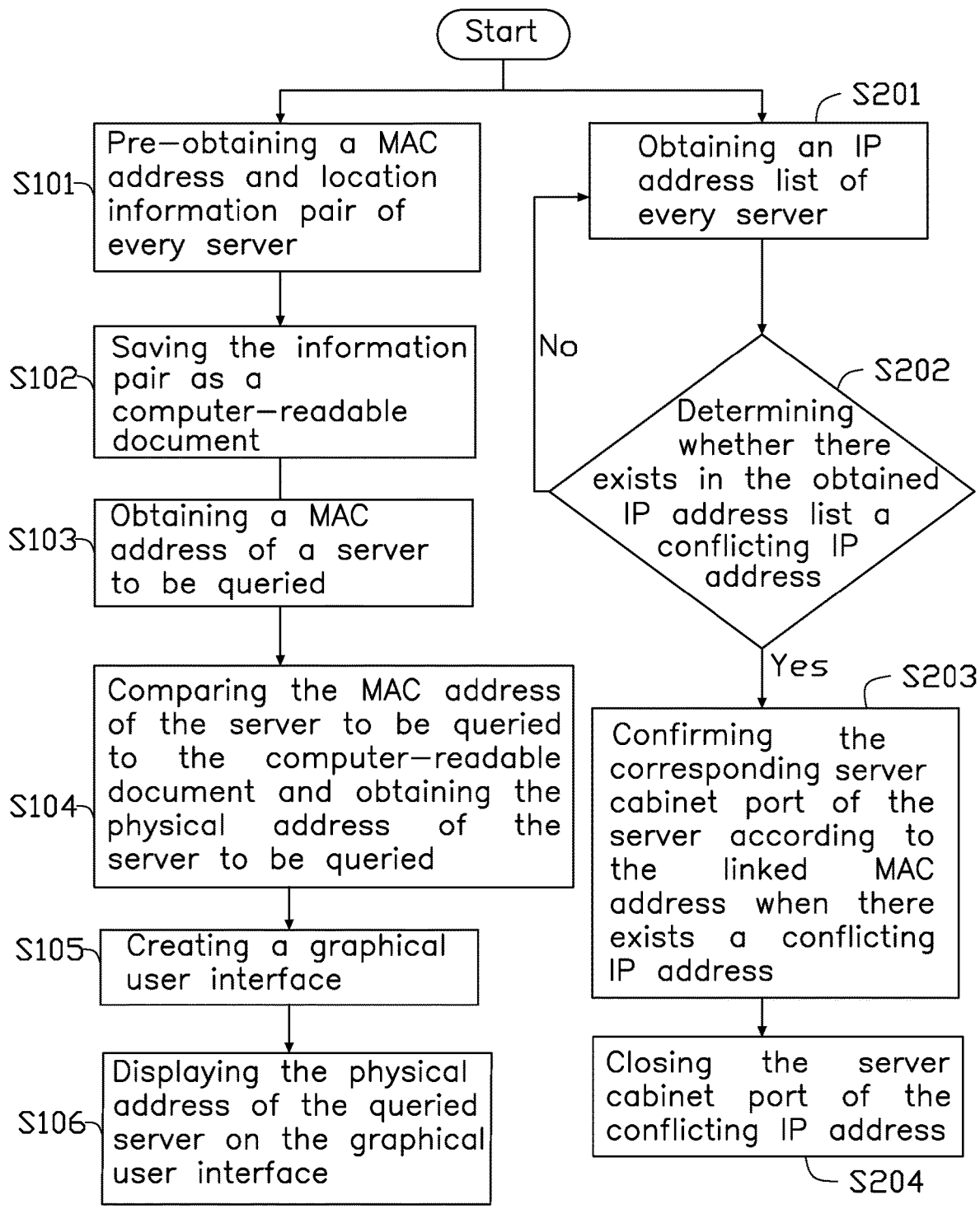
FIG. 3 is a flowchart showing an embodiment of a method of managing a data center.

FIG. 3 illustrates a flowchart of an exemplary method for managing a data center. The example method is provided by way of example, as there are a variety of ways to carry out the method. The method described below can be carried out using the configurations illustrated in FIGS. 1-2, for example, and various elements of these figures are referenced in explaining the example method. Each block shown in FIG. 3 represents one or more processes, methods, or subroutines carried out in the example method. Furthermore, the illustrated order of blocks is by example only, and the order of the blocks can be changed. Additional blocks can be added or fewer blocks can be utilized, without departing from this disclosure. The example method can begin at block S101.

At block S101, a MAC address and location information pair of every server is pre-obtained. The information pair includes information of the MAC address and a corresponding physical location.

At block S102, the information pair is saved as a computer-readable document.

For example, the obtained MAC address and location information pair can be saved as a text document.

At block S103, a MAC address of a server to be queried is obtained.

The MAC address to be queried can be searched by the data center management system 100 utilizing a data center network transmission control protocol tool.

Before querying the MAC address, a search range can be manually set. For example, in a server cabinet having rows A and columns B, the search range can set the rows A and the columns B as any positive integer number.

At block S104, the MAC address of the server to be queried is compared to the computer-readable document, and the physical address of the server to be queried is obtained.

The MAC address is a unique identifier. The MAC address can be searched in the computer-readable document to obtain the corresponding physical location.

The physical address includes the server cabinet and a server cabinet port of the server.

Referring to FIG. 2, the data center 300 includes a first server cabinet 310, a second server cabinet 320, and a third server cabinet 330.

The first server cabinet 310 deploys a first server 3101, a second server 3102, and a third server 3103.

The second server cabinet 320 deploys a fourth server 3104, a fifth server 3105, and a sixth server 3106. The third server cabinet 330 deploys a seventh server 3107, an eighth server 3108, and a ninth server 3109.

The MAC address and location information pair includes the MAC address of the server, the server cabinet of the server, and the server cabinet port.

For example, the information pair of the first server 3101 stored in the computer-readable document includes the MAC address of the first server 3101, the first server cabinet 310 of the first server 3101, and the server cabinet port 301 of the first server cabinet 310 coupled to the first server 3101.

The information pair of the second server 3102 stored in the computer-readable document includes the MAC address of the second server 3102, the first server cabinet 310 of the second server 3102, and the server cabinet port 302 of the first server cabinet 310 coupled to the second server 3102.

The information pair of the third server 3103 stored in the computer-readable document includes the MAC address of the third server 3103, the first server cabinet 310 of the third server 3103, and the server cabinet port 303 of the first server cabinet 310 coupled to the third server 3103.

The information pair of every other server stored in the computer-readable document is similar as described above. Each information pair includes a corresponding MAC address, a corresponding server cabinet of the server, and a corresponding server cabinet port coupled to the server.

When a corresponding server is queried according to the MAC address, the corresponding server cabinet and the corresponding server cabinet port coupled to the server are pre-stored in the computer-readable document to be queried.

It should be noted that FIG. 2 only illustrates an example embodiment. The data center 300 can include any number of server cabinets, and each server cabinet can include any number of server cabinet ports and servers.

In another embodiment, the instructions executed by the processor may further cause the processor to execute the following blocks as shown in FIG. 3.

At block S105, a graphical user interface is created.

At block S106, the physical address of the queried server is displayed on the graphical user interface.

The graphical user interface displays a corresponding distribution map of every server cabinet and every server in the data center 300.

The physical address of the queried server is displayed on the graphical user interface by highlighting an icon of the queried server.

In another embodiment, the instructions executed by the processor may further cause the processor to execute the following blocks.

At block S201, an IP address list of every server is obtained. Each IP address is linked to a corresponding one of the MAC addresses.

At block S202, whether there exists in the obtained IP address list a duplicate IP address is determined.

At block S203, when there exists a duplicate IP address, the corresponding server cabinet port of the server according to the linked MAC address is confirmed.

At block S204, the server cabinet port of the duplicate IP address is closed.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A method of managing a data center deploying a plurality of server cabinets, each server cabinet deploying a plurality of servers, each server coupled to a data center network, the method comprising:
   pre-obtaining a MAC address and location information pair of every server, the information pair comprising information of the MAC address and a corresponding physical location;
   saving the information pair as a computer-readable document;
   obtaining a MAC address of a server to be queried;
   comparing the MAC address of the server to be queried to the computer-readable document and obtaining the physical address of the server to be queried, wherein the physical address comprises the server cabinet and a server cabinet port of the server being located;
   obtaining an IP address list of every server, each IP address linked to a corresponding one of the MAC addresses;
   determining whether there exists in the obtained IP address list a duplicate IP address;
   confirming, when there exists a duplicate IP address, the corresponding server cabinet port of the server according to the linked MAC address; and
   closing the server cabinet port of the duplicate IP address according to the physical address.

2. The method of claim 1, wherein after comparing the MAC address of the server to be queried to the computer-readable document and obtaining the physical address of the server to be queried, the method further comprising:
   creating a graphical user interface; and
   displaying the physical address of the queried server on the graphical user interface.

3. The method of claim 2, wherein the graphical user interface comprises a corresponding distribution map of every server cabinet and every server in the data center; and the physical address of the queried server is displayed on the graphical user interface by highlighting an icon of the queried server.

4. A data management system deploying a plurality of server cabinets, each server cabinet deploying a plurality of servers, each server coupled to a data center network, the data management system comprising:
   a processor; and
   a storage unit coupled to the processor and configured to store a plurality of instructions, which when executed by the processor, cause the processor to:
      pre-obtain a MAC address and location information pair of every server, the information pair comprising information of the MAC address and a corresponding physical location;
      save the information pair as a computer-readable document;
      obtain a MAC address of a server to be queried;
      compare the MAC address of the server to be queried to the computer-readable document and obtain the physical address of the server to be queried, wherein the physical address comprises the server cabinet and a server cabinet port of the server being located;
      obtain an IP address list of every server, each IP address linked to a corresponding one of the MAC addresses;
      determine whether there exists in the obtained IP address list a duplicate IP address;
      confirm, when there exists a duplicate IP address, the corresponding server cabinet port of the server according to the linked MAC address; and
      close the server cabinet port of the duplicate IP address according to the physical address.

5. The data management system of claim 4, wherein after the MAC address of the server to be queried is compared to the computer-readable document and the physical address of the server to be queried is obtained, the processor is further caused to:
   create a graphical user interface; and
   display the physical address of the queried server on the graphical user interface.

6. The data management system of claim 5, wherein the graphical user interface comprises a corresponding distribution map of every server cabinet and every server in the data center; and the physical address of the queried server is displayed on the graphical user interface by highlighting an icon of the queried server.

7. A non-transitory storage medium having stored thereon instructions that, when executed by at least one processor of a data center management system, causes the at least one processor to execute instructions of a method for managing a data center deploying a plurality of server cabinets each deploying a plurality of servers, each server coupled to a data center network, the method comprising:

pre-obtaining a MAC address and location information pair of every server, the information pair comprising information of the MAC address and a corresponding physical location;

saving the information pair as a computer-readable document;

obtaining a MAC address of a server to be queried;

comparing the MAC address of the server to be queried to the computer-readable document and obtaining the physical address of the server to be queried, wherein the physical address comprises the server cabinet and a server cabinet port of the server being located;

obtaining an IP address list of every server, each IP address linked to a corresponding one of the MAC addresses;

determining whether there exists in the obtained IP address list a duplicate IP address;

confirming, when there exists a duplicate IP address, the corresponding server cabinet port of the server according to the linked MAC address; and closing the server cabinet port of the duplicate IP address according to the physical address.

8. The non-transitory storage medium of claim 7, wherein after comparing the MAC address of the server to be queried to the computer-readable document and obtaining the physical address of the server to be queried, the method further comprises:

creating a graphical user interface; and displaying the physical address of the queried server on the graphical user interface.

9. The non-transitory storage medium of claim 8, wherein the graphical user interface comprises a corresponding distribution map of every server cabinet and every server in the data center; and the physical address of the queried server is displayed on the graphical user interface by highlighting an icon of the queried server.

* * * * *